United States Patent [19]
Latta

[11] Patent Number: 5,704,496
[45] Date of Patent: Jan. 6, 1998

[54] MODULAR TOOL RACK SYSTEM

[76] Inventor: Paul P. Latta, #10 Warridge Dr., St. Louis, Mo. 63124

[21] Appl. No.: 506,036

[22] Filed: Jul. 24, 1995

[51] Int. Cl.[6] .................................................. A47F 7/00
[52] U.S. Cl. ............................................................ 211/70.6
[58] Field of Search ................................. 211/70.6, 60.1, 211/86, 88, 113

[56] References Cited

U.S. PATENT DOCUMENTS

| | | |
|---|---|---|
| D. 243,752 | 3/1977 | Kardas . |
| D. 287,777 | 1/1987 | Hellwig et al. . |
| D. 332,682 | 1/1993 | Staab . |
| 2,035,639 | 3/1936 | Davis . |
| 2,291,343 | 7/1942 | Millstone et al. . |
| 2,623,642 | 12/1952 | Looney . |
| 2,778,654 | 1/1957 | Gottlieb . |
| 3,145,031 | 8/1964 | Wilkinson . |
| 3,298,532 | 1/1967 | Wilcke ................................ 211/70.6 |
| 3,759,538 | 9/1973 | Fabiano . |
| 3,874,531 | 4/1975 | Mayo . |
| 3,894,748 | 7/1975 | Ratcliff . |
| 4,281,843 | 8/1981 | Johnson et al. . |
| 4,350,366 | 9/1982 | Helms . |
| 4,357,728 | 11/1982 | Pravettone . |
| 4,652,062 | 3/1987 | Greenwood . |
| 4,672,703 | 6/1987 | Frazier ................................ 211/70.6 |
| 4,923,202 | 5/1990 | Breveglieri et al. . |
| 5,092,463 | 3/1992 | Dees ................................ 211/70.6 X |
| 5,318,315 | 6/1994 | White et al. . |
| 5,333,885 | 8/1994 | Pullman . |
| 5,390,944 | 2/1995 | Sherwin . |

*Primary Examiner*—Alvin C. Chin-Shue
*Assistant Examiner*—Sarah L. Purol
*Attorney, Agent, or Firm*—Polster, Lieder, Woodruff & Lucchesi, L.C.

[57] ABSTRACT

A modular system of racks for mounting on a wheeled container to convert the wheeled container into a tool-bearing yard and garden cart. The system of racks contains a plurality of individual racks for removably mounting to the peripheral edge of an open wheeled container. Each rack is designed to hold a specific yard or garden tool. Each individual rack is hingedly connected to adjacent racks so that the system of racks conforms to the shape of the wheeled container.

20 Claims, 6 Drawing Sheets

MODULAR TOOL RACK SYSTEM

BACKGROUND OF THE INVENTION

This invention relates generally to yard and garden tool carriers and, in particular, to a modular system of racks that can be attached to an existing wheeled device, such as a large volume trash container having wheels, to make a yard or garden cart.

When a homeowner, gardener or groundskeeper begins a yard or garden project he or she must first decide which tools, equipment or accessories that are needed for the project. Next, the gardener, for example, must go to a storage facility, such as a tool shed, garage or basement, and retrieve each tool or accessory from storage. Such common tools and equipment include shovels, hoes, rakes, shears, hoses, electrical cords, trimmers, gloves, flower pots and so on. The gardener then must tote all of the tools and equipment to the project site. Gathering and moving the yard or gardening tools can require several trips. Often, during the course of the project, the gardener discovers that he or she needs some additional or alternative tool or piece of equipment, which requires the gardener to leave the project and make additional trips to the storage facility.

Many lawn and garden projects also require the use of bulk materials such as mulch, fertilizer, seed and so on that must be hauled to the site. Therefore, the gardener must make several trips back-and-forth to gather the tools and equipment and then additional trips to haul the bulk material.

Furthermore, during the typical yard or garden project, there is refuse such as weeds, grass, limbs or litter to be disposed of. Moving the refuse from the project site to a storage or disposal site requires additional time, as well as equipment or supplies such as trash containers, lawn bags or a wheelbarrow. When the project is completed, all of the tools and equipment must be moved back to the storage facility and put away. Some pieces of equipment, such as rakes and shovels are stored on wall racks or just stacked against a wall. Some paraphernalia, such as gloves, hand tools or small pots, are placed on a shelf or stored in a drawer. In any event, each tool must individually must be returned to its storage site.

It is appreciated that much of the time dedicated to completing a yard or garden project is spent in handling equipment and tools. A number of yard carts capable of holding and transporting lawn and garden tools are known. A number of these carts allow the user to load tools on the cart and move them to the project site. Some of the carts serve to move bulk material to the site or move the refuse from the project site to a storage or disposal site. However, the prior art carts all have significant limitations, as will be discussed hereinafter.

U.S. Pat. No. 3,894,748, to Ratcliff, provides a lawn and garden cart having limited tool storage capacity. Ratcliffs cart has no means for hanging electrical cords or hoses. There appears to be only one small shelf. There is no storage for short, wide-handled tools such as flat shovels or pitchforks.

U.S. Pat. No. 4,281,843, to Johnson et al. discloses a tool carrier that cannot hold a significant volume of refuse or other bulk material. Furthermore, the tray 14 cannot hold tools and other cargo, such as refuse, at the same time.

The patent to Fabiano, U.S. Pat. No. 3,759,538, does not provide a refuse or bulk material container. Furthermore, it does not have means for storing short, wide-handled tools. Likewise, U.S. Pat. No. 3,145,031, to Wilkinson, fails to provide a trash or refuse holding area. Moreover, Wilkinson's apparatus does not have hooks or other means for hanging cords, hoses or twine. The lawn and garden cart shown U.S. Pat. No. 4,350,366, to Helms, also fails to provide means for hanging cords or hoses and lacks space for wide-handled shovels and the like.

U.S. Pat. No. 5,318,315, to White et al. provides a wheeled cart lacking means for storing wide-handled shovels, hanging cords or hoses. White's invention appears to accommodate long, thin-handled tools, but requires the user to carefully insert the tool handle in a small bore opening. U.S. Pat. No. 5,390,944, to Sherwin, has no trash or bulk material container, no means for storing wide-handled tools and no structure for hanging electrical cords or hoses. U.S. Pat. No. 2,778,654, to Gottleib, appears to suffer many of the same shortcomings as the above-stated inventions, having no means for accommodating wide-handled tools, cords, or hoses or bulk material or refuse.

From the above discussion it is apparent that none of the prior art tool carriers or carts addresses the major needs of the groundskeeper or gardener. For example, none of these devices holds and transports, at the same time, all of the types of conventional tools and equipment required by a gardener or groundskeeper. Therefore, the user is forced to make multiple trips away from the project site to gather tools and equipment. Moreover, if the cart lacks a large volume container for holding refuse or bulk material such as mulch, top soil, fertilizer, seed and so on, the gardener must make additional trips with a second cart or wheelbarrow.

Finally, the prior art carts and the tool holding elements of those carts are integral. The tool holding elements of the cart cannot be removed from the cart. This limits the utility and versatility of the cart. Also, since the tool holding elements are integral with the cart, the utility and versatility of the tool holding elements are limited. The user only can carry those tools for which the tool holding elements were designed. The prior art carts lack the flexibility of allowing the user to decide which tools he or she wants to carry. Moreover, if the cart breaks or fails while the tool storing elements remain useable, the entire cart must be discarded and replaced even thought the tool racks, shelves and hooks are functional.

SUMMARY OF THE INVENTION

It is among the principal objects of the present invention to provide a system of racks that can be attached to a wheeled container to convert the wheeled container into a convenient yard and garden cart for conveniently holding and transporting the tools and bulk material.

It is another object of the present invention to provide the system of racks that contains interchangeable individual racks and shelves, each individual rack or shelf being designed to hold a different size or shape tool or piece of equipment so that the user can custom design a yard and garden cart to meet the user's needs.

It is still another object of the present invention to provide the system of racks wherein the individual racks can be removed from the wheeled cart with the tools and equipment thereon and then mounted on a wall or the like for storage so as to provide a wall mounted storage system when removed from the wheeled cart.

Another object of the present invention is to provide a system of racks wherein the racks can be removed to allow the wheeled cart to be used without the racks.

Another object of the invention is to provide individual racks that are hingedly interlocking so that the connected racks will be stable and conform to the external shape of the wheeled container so that the racks can be fitted to a substantially rectangular container or a round container.

It is a still further object of the present invention to provide the system of racks having individual storage racks and shelves that can accommodate a plurality of different tools or pieces of equipment or supplies including, but not limited to small hand tools, long-handled shovels, hoes and rakes, wide-handled shovels, flower pots, hoses, electrical cords and so on.

A further object of the invention is to provide such a system of racks and shelves made from a durable material that can be transferred to another wheeled container in the event the original wheeled container breaks or fails, thereby increasing the life of the system and rendering it more economical to use.

A still further object of the present invention is to provide such a system of racks that is economical to manufacture, durable, easy to clean and maintain, easy to use, and well suited for its intended purpose.

In accordance with the invention, briefly stated, a system of racks is provided for mounting on a wheeled container, such as a wheeled trash container, to convert the wheeled container into a yard cart. The system of racks contains a plurality of individual racks. Each rack is removably mounted to the peripheral edge of the container. Each rack is hingedly connected to the adjacent racks so that the system of racks conforms to the shape of the wheeled container. Each individual rack is designed as a mounting rack or shelf to hold a different type of tool or piece of equipment including, but not limited to, long-handled shovels, rakes and hoes, wide-handle shovels, hoses, electrical cords, flower pots and so on. The individual racks can be removed from the wheeled container with the equipment thereon and mounted on a wall or other flat surface for storage.

The invention, therefore, is a system of racks designed to hook over the sides of any existing wheeled container, preferably a trash container. The wheeled container can be of any appropriate size 30 to 90 gallon and can be round, rectangular or square. The racks are specifically designed to hold all conventional yard and garden tools and equipment. Once hooked onto the container and loaded with tools, the system provides easy transportation to any home job site or permanent storage for tools and other items. The wheeled container can be used for yard and garden debris. If the racks are removed, the wheeled container can be used as a conventional trash container.

The racks are modular so that the user can select only those individual racks specifically designed for his or her needs. In the preferred embodiment, there are individual or modular racks: 1.) to hold long-handled tools such as rakes, brooms, and hoes; 2.) to hold shorter, wide-handled tools such as shovels, pitchforks and picks; 3.) to hold smaller hand tools such as grass shears and pruning shears; 4.) to hold hanging items such as hand saws, electric cords, and hoses; and 5.) to hold loose or separate items such as pots, seeds, and gloves. Although these five categories of racks are included in the preferred embodiment, the invention anticipates the use of various other racks and shelves as the need arises. For example, an individual rack can be designed to hold the user's comfort items such as a drink cup, sun screen, small portable radio and so on. The user can custom-build his or her own system by selecting combination of modular racks.

The rack system contains a set of wall mounted brackets. Each bracket can accept and hold one or more of the modular racks. The user can mount the wall bracket in a convenient storage location, such as a tool shed. The individual rack, with the tools in place, can be removed from the container and hung on the wall bracket for storage. This frees the container for other uses and provides permanent tool storage for long periods of time.

DESCRIPTION OF THE PREFERRED EMBODIMENT

Figure 1:
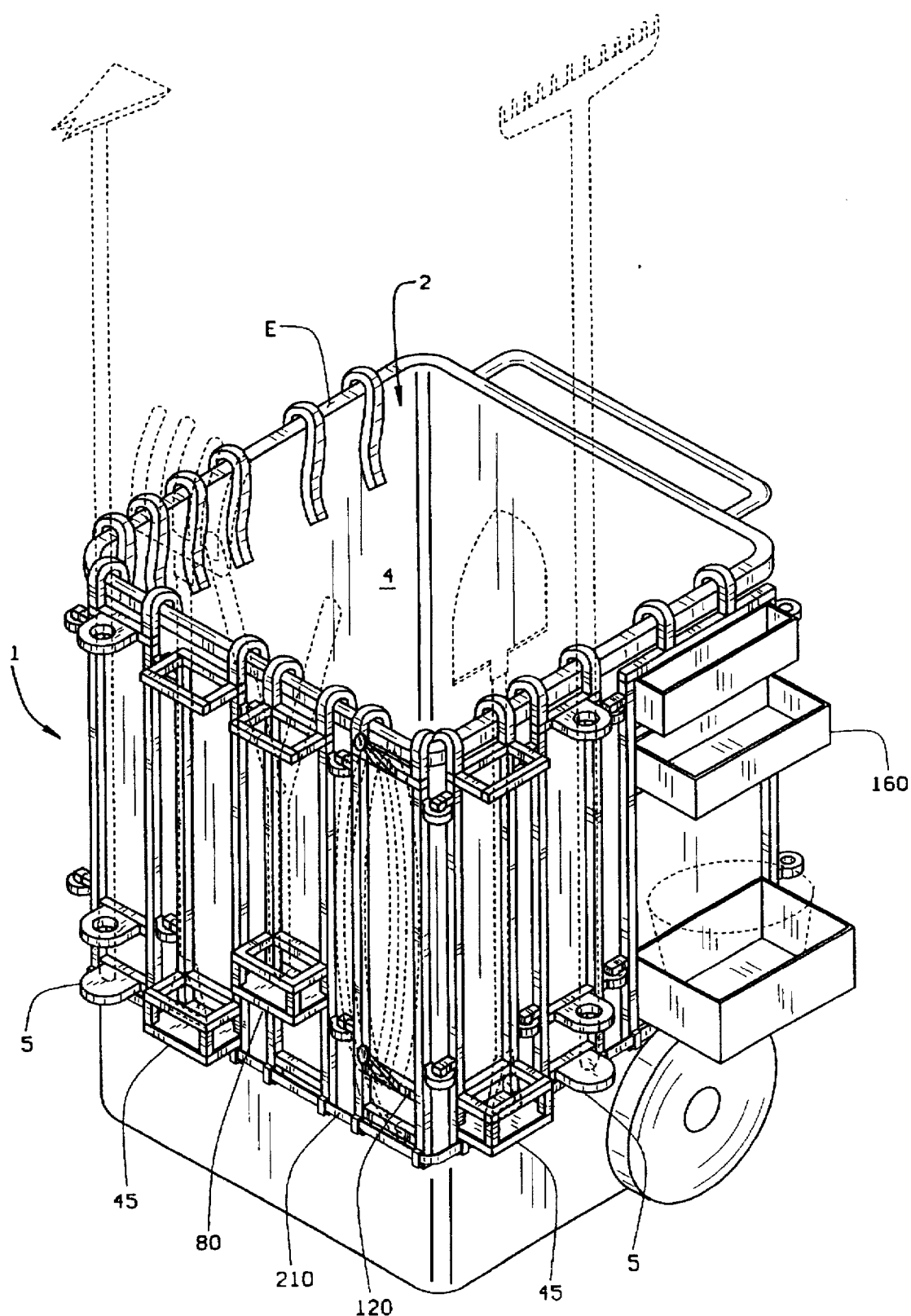
FIG. 1 is a perspective view of the rack system of the present invention mounted on a rectangular wheeled container.
Figure 2:
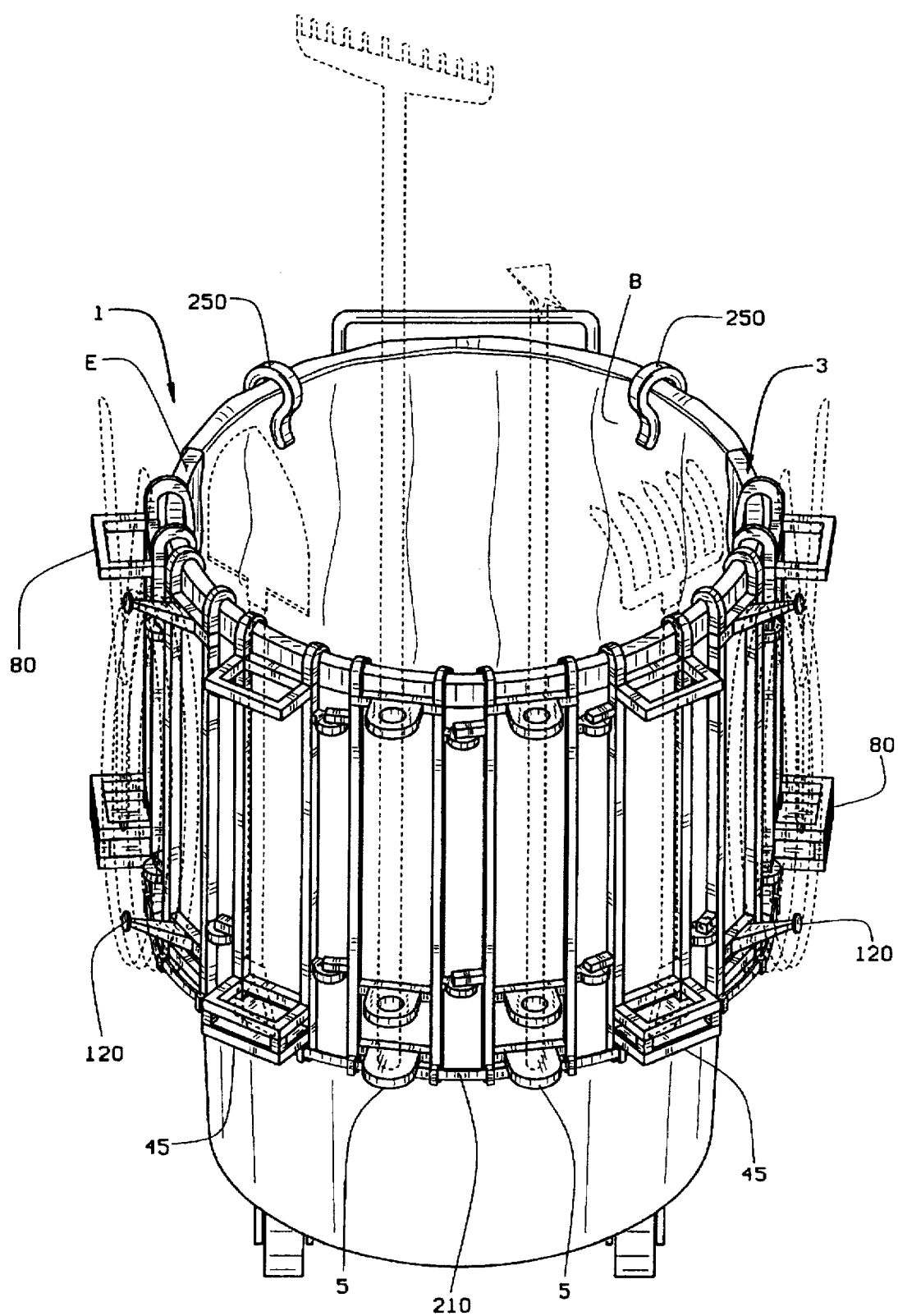
FIG. 2 is a perspective view of the rack system of the present invention mounted on a round wheeled container with a trash bag, shown partially cut away, lining the inside of the wheeled container.

The rack system of the present invention is indicated generally by reference numeral 1 in FIGS. 1–4. The rack system 1 is designed to be removably attached to a substantially rectangular wheeled container, as indicated by numeral 2 in FIGS. 1 and 3, or to a substantially round container, as indicated by numeral 3 in FIGS. 2 and 4. Each wheeled container defines an internal chamber 4. Internal chamber 4 can vary in size and can range from 30 to 90 gallons. The internal chamber 4 can be used to hold bulk material such as refuse, mulch or fertilizer. Furthermore, chamber 4 can be lined with a plastic bag B (FIG. 2) to hold the bulk material for easy disposal. Wheeled container 2 or 3 preferably is a conventional wheeled trash container made from a durable, maintenance free material such as plastic or other resin material.

As can be seen in FIGS. 1–4, rack system 1 contains a plurality of interlocking individual racks. System 1 can be custom designed by the user by inclusion of various different individual racks. The individual racks are interchangeable and each of the individual racks is designed to accommodate a different type of common yard and garden tool or supply. Hereinafter, and in the appended claims, the generic term "tools", unless specifically defined, is intended to cover all types of yard or garden tools, equipment or supplies including, but not limited to, rakes, brooms, long-handled shovels, wide-handled shovels, hoes, pitchforks, pruning shears, lopping shears, grass shears, hand shovels, hand rakes and hoes, electric cords, hoses, ropes, hand saws, pots, seed packs, gloves, bags, as well as bulk materials such as mulch, fertilizer, refuse, peat moss and soil, and so forth. The individual racks, as well as other unique elements of rack system 1 will now be described in greater detail.

Figure 3:
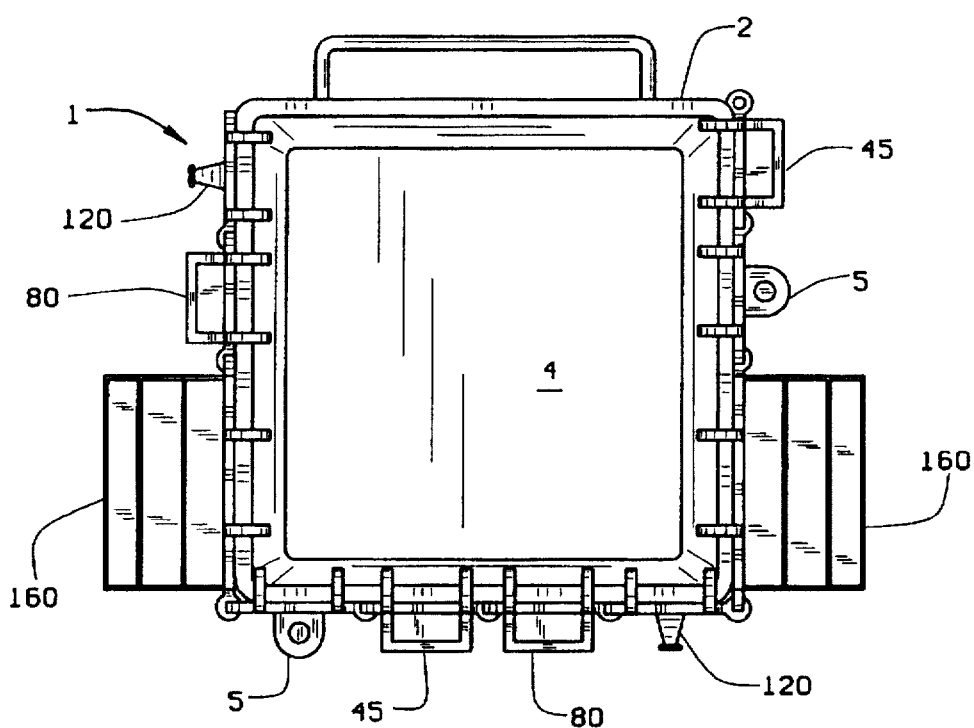
FIG. 3 is a top plan of the rack system mounted on a rectangular wheeled container.
Figure 4:
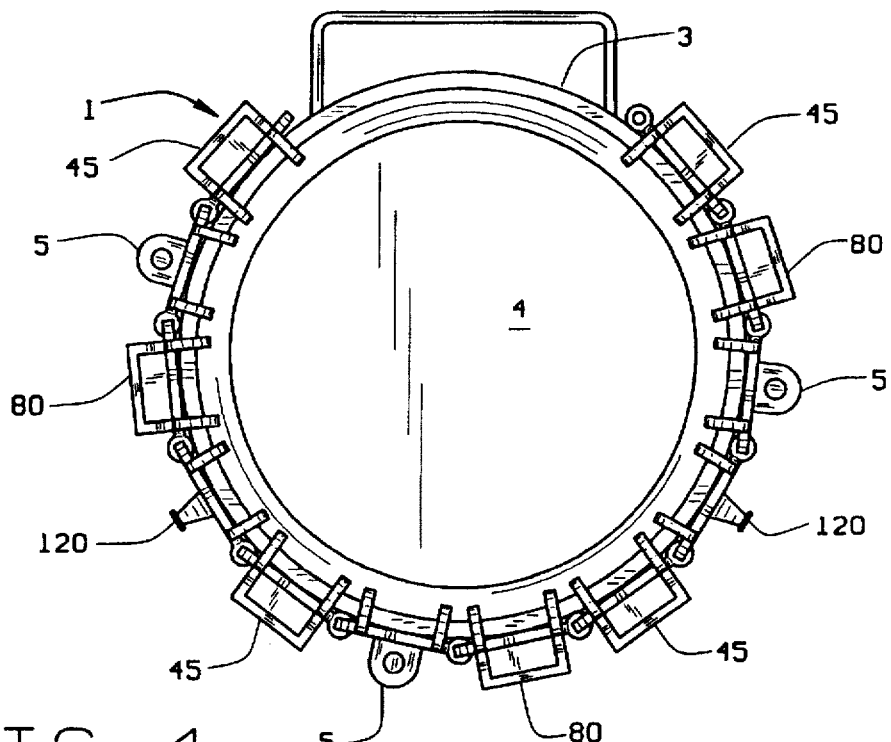
FIG. 4 is a top plan of the rack system mounted on a round wheeled container.
Figure 5:
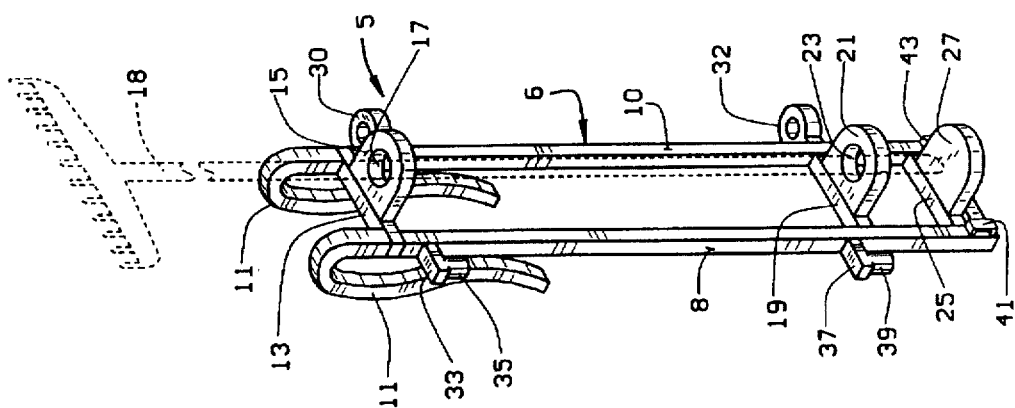
FIG. 5 is an isometric view of an individual long-handled tool rack of the rack system of the present invention, a long-handled tool shown in phantom to illustrate environment.

FIG. 5 best illustrates an individual long-handled tool rack 5. Several of the rack 5 also are shown attached to a wheeled container in FIGS. 1–4. Rack 5 has a generally elongated frame 6 with a pair of spaced apart, vertically extending frame members 8 and 10. Each vertical frame member has, at its upper end, an integral downwardly depending loop 11. Each respective loop 11 extends partway down the back side of each respective vertical frame member. Loop 11 is dimensioned to fit snugly over the upper edge E of a wheeled container. Rack 5 has a first or upper horizontal cross brace 13 between the vertical frame members. As best seen in FIGS. 3–5, upper horizontal cross brace 13 has a protruding ear 15. There is an opening 17 formed centrally in ear 15. Opening 17 is dimensioned to accommodate the introduction of the handle of a long-handled tool 18, as shown in FIG. 5.

There is a second horizontal cross brace 19 positioned between the vertical frame members near their respective lower ends. Cross brace 19 also has protruding ear 21 with an opening 23 formed therein to accommodate the introduction of the tool handle. A third or bottom horizontal cross brace 25 is positioned below the second cross brace. Bottom horizontal cross member 25 also has a protruding ear 27. However, ear 27 does not have an opening. Ear 27 functions as base or floor upon which the tool handle rests.

There is an upper hinge ring 30 and a lower hinge ring 32 which extend horizontally from the outer side of vertical frame member 10. An upper hinge arm 33 with a vertically depending hinge pin 35 and a lower hinge arm 37 with a depending hinge pin 39 extend from the outside of vertical frame member 10. There is a first strap loop 41 on the bottom end of member 8 and a second strap loop 43 on the bottom end of vertical frame member 10. It will be appreciated that the upper hinge arm and upper hinge ring and the lower hinge arm and lower hinge ring are in substantial horizontal alignment so the hinge pins of one rack can engage the hinge rings of an adjacent rack as will be described in greater detail below.

It will be understood that the individual rack 5, as well as the individual racks to be described hereinafter, in the preferred embodiment, are constructed from a durable, maintenance free, lightweight material such as plastic or other resin material. The entire rack can be molded as one unitary piece or can be molded in individual elements and then appropriately assembled. However, the racks can be fashioned from other useful materials such as aluminum or wood without departing from the scope of the invention.

Furthermore, it will be appreciated that the overall dimensions of each individual rack are such as to allow a number of the racks to be mounted around the edge E of a wheeled container and yet function to hold a desired tool. For example, the width of a rack 5, as just described, may be approximately 3 to 4 inches. The lengths of the individual racks, however, should be uniform to facilitate the mounting and securing of the system of racks as will be explained below.

Figure 6:
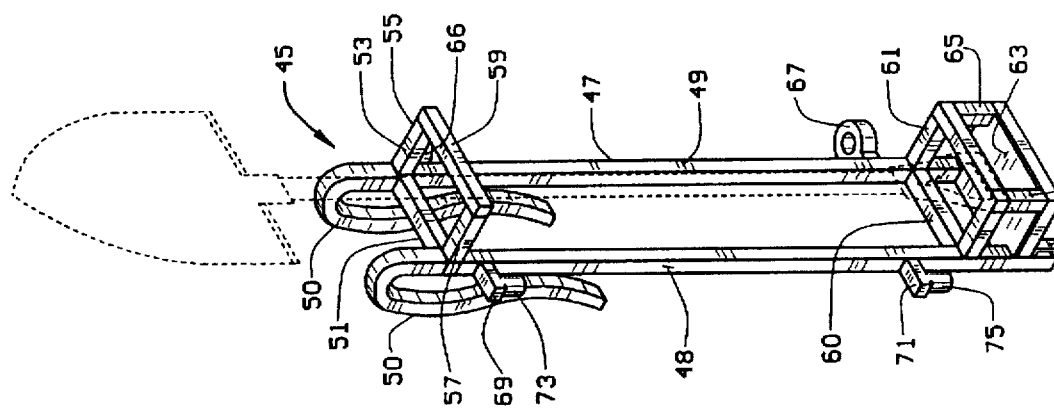
FIG. 6 is an isometric view of an individual wide-handled tool rack, a wide handled tool shown in phantom to illustrate environment.

An individual wide-handled tool rack is shown in greater detail in FIG. 6, as well as FIGS. 1–4, and is indicated generally by reference numeral 45. It will be appreciated that wide handled tool rack 45 has an elongated frame 47 that is essentially the same in structure as frame 6 described above. Frame 47 has a first vertical frame member 48 and, spaced apart, a second vertical frame member 49. Each vertical frame member has, at its upper end, a downwardly depending loop 50. Frame 47 has an upper horizontal cross brace 51. Cross brace 51 has a protruding rectangular frame 53 on the front side. Frame 53 has a pair of opposed horizontally extending side members 55 and 57 with a connecting front cross member 59. Frame 53 is sized to allow the introduction of a wide-handled tool. A second or lower cross brace 60 has an protruding frame 61 constructed substantially similar to frame 53. However, there is a floor 63 under frame 61 connected by front vertical posts 65. Floor 63 supports the handle of a wide-handled tool while frames 53 and 61 hold the tool in place.

Rack 45 also has a pair of vertically aligned hinge rings 66 and 67 on vertical frame member 49 and a pair of vertically aligned hinge arms 69 and 71 on vertical frame member 48. Hinge arm 69 has a depending hinge pin 73 and hinge arm 71 has a depending hinge pin 75. The hinge arms and hinge rings are in substantial horizontal alignment, as explained above with reference to rack 5. There is a strap loop 79 on the bottom end of vertical frame member 48 and a corresponding strap loop (not seen) on vertical frame member 49.

Figure 7:
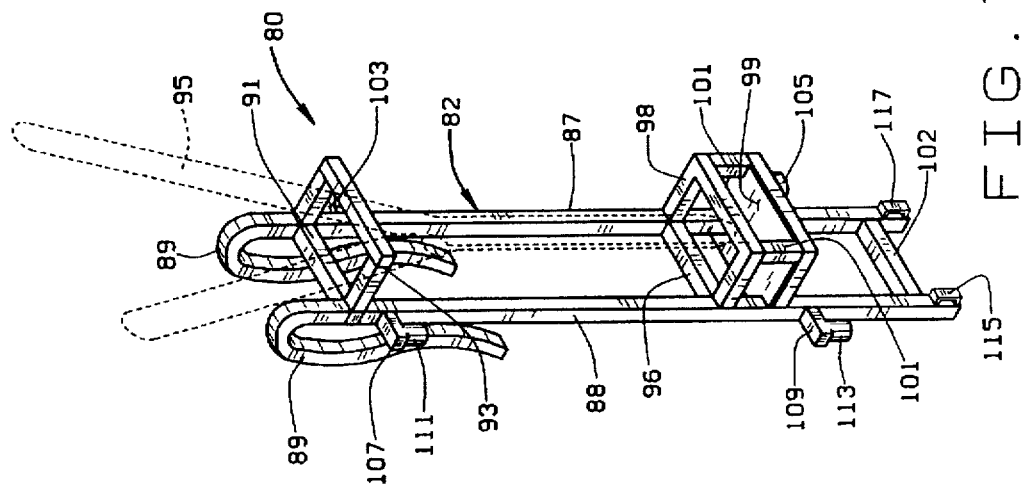
FIG. 7 is an isometric view of an individual hand tool rack, a hedge shears shown in phantom to illustrate environment.

A hand tool rack, indicated generally by reference numeral 90, is best illustrated in FIG. 7. Several also are shown mounted on wheeled containers in FIGS. 1–4. Rack 80 is constructed similar to the previously described racks, having a generally elongated frame 82 with a pair of spaced apart, vertically extending frame members 87 and 88. Each vertical frame member has, at its upper end, an integral, downwardly depending loop 89 dimensioned to fit over the edge E of a wheeled container, as previously described. Rack 80 has a first or upper horizontal cross brace 91. Cross brace 91 has a protruding rectangular frame 93 constructed similarly to frame 53 previously described. Frame 93 is dimensioned to seat the handles of a hand tool, such as hedge shears 95, shown in FIG. 7.

A second or lower cross brace 96 has a protruding frame 98 similar to frame 93. Them is a floor 99 under frame 93 connected to frame 98 by front vertical posts 101. Floor 99 is designed to support the tool. It will be appreciated that the frame 98 and floor 99 of rack 80 is substantially closer to upper frame 93 than in the previously described individual rack to accommodate shorter tools. There is third or bottom cross brace 102 between the bottom ends of the vertical frame members to impart lateral stability to the frame.

Rack 80 has a pair of vertically aligned hinge rings 103 and 105 on vertical frame member 87 and a pair of vertically aligned hinge arms 107 and 109 on vertical frame member 85. Hinge arm 107 has a depending hinge pin 111 and hinge arm 109 has a depending hinge pin 113. There is a strap loop 115 on the bottom end of vertical frame member 85 and a corresponding strap loop 117 on the bottom end of vertical frame member 87.

Figure 8:
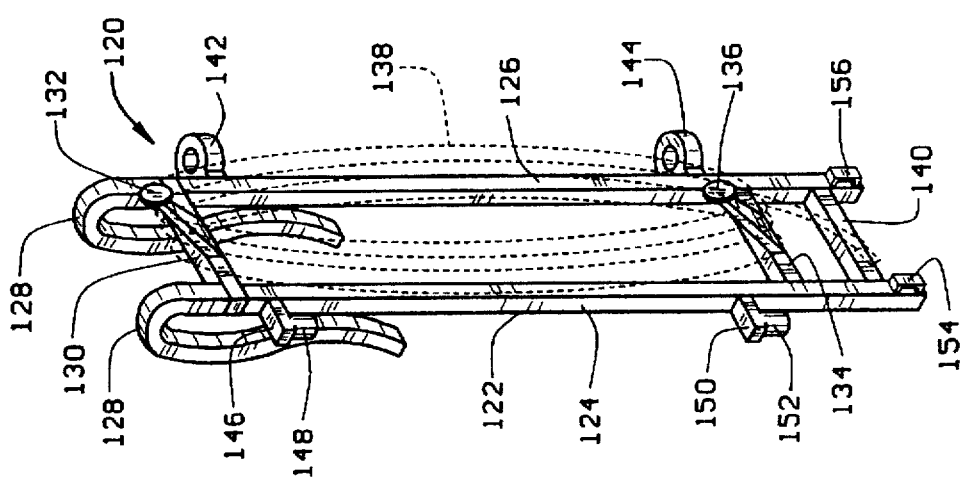
FIG. 8 is an isometric view of an individual hose or cord rack, a hose shown in phantom to illustrate environment.

An individual rack designed to hold long, draping tools such as hoses or electric cords is indicated generally by reference numeral 120 in the drawings and is best shown in FIG. 8. Rack 120 also has an elongated frame 122 with a pair of spaced apart, vertically extending frame members 124 and 126. Each vertical frame member has an integral downwardly depending loop 128 at its upper end. Rack 120 has a first or upper horizontal cross brace 130 between the vertical frame members. There is a peg 132 extending out from brace 130 and angled slightly upward. There also is a second or lower horizontal cross brace 134 having a peg 136 extending therefrom. Peg 136 can be upwardly angled, as shown, or can be straight, or even downwardly angled. The pegs 132 and 136 are in vertical alignment. A hose 138 or electric cord or any other flexible, elongated tool or device can be wrapped around the pegs. A third or bottom cross brace 140 extends between the vertical frame members near the bottom of the frame to impart lateral stability.

There is an upper hinge ring 142 and a lower hinge ring 144 which extend horizontally from the outside of vertical frame member 126. The hinge rings are in vertical alignment. An upper hinge arm 146 having a downwardly depending hinge pin 148 and a lower hinge arm 150 having a downwardly depending hinge pin 152, also in vertical alignment, extend horizontally from vertical frame member 124. A first strap loop 154 is located on the bottom front side of vertical frame member 124 and a second strap loop 156 located on the bottom front side of vertical frame member 126.

Figure 9:
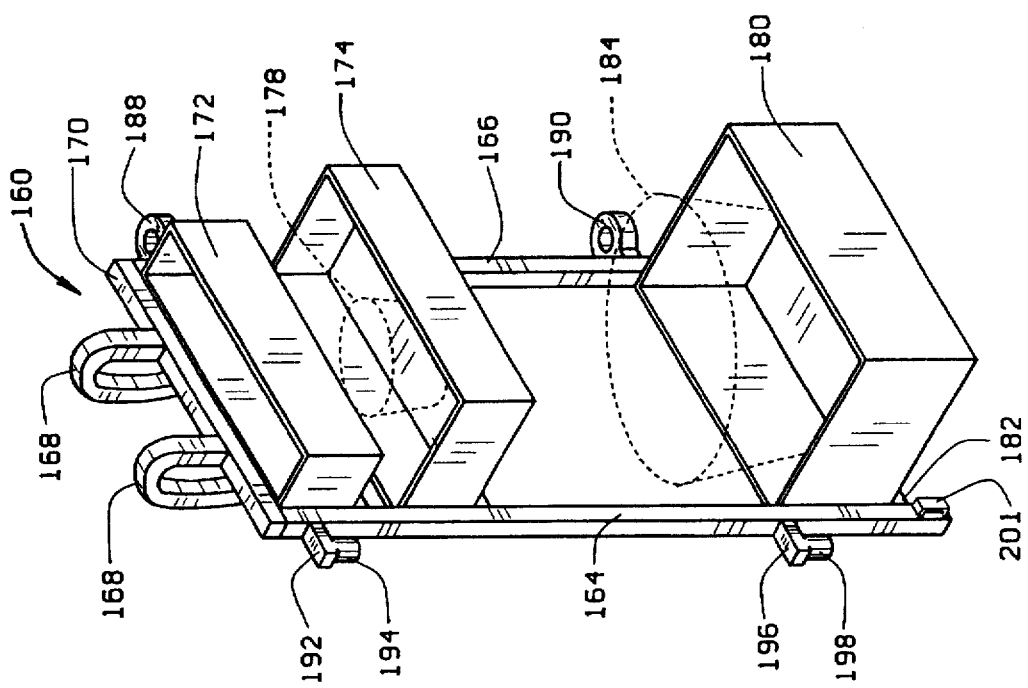
FIG. 9 is an isometric view of an individual shelf rack, a flower pot and pail shown in phantom to illustrate environment.

A shelf-bearing individual rack, indicated generally in the drawings by reference numeral 160 is shown in greater detail in FIG. 9. Rack 160 also has a generally elongated frame 162. Frame 162 is the same overall length of the previously described individual racks. However, rack 160 can be somewhat wider that the previously described individual racks. Frame 162 has a pair of spaced apart, vertically extending frame members 164 and 166. Each vertical frame member has an integral loop 168 at the upper end. Rack 160 has a first or upper cross brace 170. As just stated, cross brace 170 is somewhat wider than the previously described cross braces. Immediately below cross brace 170 is a first or upper shelf 172.

Upper shelf 172, in the illustrated embodiment, is constructed like a bin having a substantially box-like structure with four side walls and a floor. The shelf 172 is open on top to accommodate the storage of small tools, seed packs, gloves and so on. There is a second or middle shelf 174 attached between the vertical frame members and positioned below the upper shelf, leaving sufficient clearance between the shelves for easy access. Shelf 176 also is a box-like structure, having four side walls and a floor and is designed to hold intermediate sized loose tools such a flower pot 178. A third or bottom shelf 180 is attached between the vertical frame members near the bottom of the vertical frame members. There is a cross brace 182 between the vertical frame members under the bottom shelf to stabilize shelf rack 160. Bottom shelf 180, as shown in the illustrated embodiment, is an open, box-like structure having four sides and a floor. Shelf 180 is substantially larger in volume that either shelf 176 or 172 to accommodate a larger tool such a bucket or pail 184.

It will be appreciated that the respective shelves made be of any appropriate size and depth, ranging from a substantially flat shelf to the bin-like structures illustrated, and located at any appropriate position between the vertical frame members. In the preferred embodiment, however, the shelves are of an increasing size and volume, top to bottom, so as to accommodate varying sizes of tools and supplies on one rack. It should be noted that the individual shelves also can have hinged lids (not shown) to close the shelf.

Moreover, the illustrated embodiment shows the shelves as fixed between the vertical frame members. However, they also can be removably attached, for example with a snap-in mechanism or the like, so that the shelves can be changed or rearranged within the frame.

An upper hinge ring 188 and a lower hinge ring 190 extend horizontally from the outer side of vertical frame member 166. An upper hinge arm 192 having a depending hinge pin 194 and a lower hinge arm 196 having a depending hinge pin 198 extend horizontally from vertical frame member 164. There is a first strap loop 201 on the bottom front side of vertical frame member 164 and a corresponding strap loop (not shown) on the bottom front side of vertical frame member 166.

FIGS. 3 and 4 illustrate the unique flexible, interlocking feature of system 1 imparted by the hinge arm and hinge ring structures. As will be appreciated, the depending hinge pins of one individual rack engage the hinge rings of the adjacent rack. This arrangement allows the individual racks to be secured to the adjacent racks to prevent movement of the racks while the wheeled cart is being transported. Moreover, a securing strap 210 (FIGS. 1 and 2) is laced through the various loop straps on the bottom front sides of various rack frames. The strap 210 can be drawn tight and secured to itself with a buckling means or Velcro or other appropriate securing means. Strap 210 holds the bottoms of the individual racks close to the wheeled container to prevent the racks from moving or flopping when the container is rolled. It will be appreciated, however, the interlocking hinge means with the upper and lower hinges, in most cases, is sufficient to secure the system to the container.

It also will be appreciated, from FIGS. 1–4, that the interlocking hinge arrangement allows system 1 to conform to the shape of the wheeled container. As best seen in FIGS. 3 and 4, the various hinge rings can rotated about the associated hinge pins. For example, in FIG. 3, the adjacent racks 80 and 120 are interlocked around a corner of the rectangular wheeled container. Likewise, the interlocking hinge arrangement allows system 1 to conform to the circular shape of the round wheeled container, as shown in FIG. 4. This feature enhances the versatility of the system, allowing it to be used with conventional wheel trash containers of either configuration.

Figure 10:
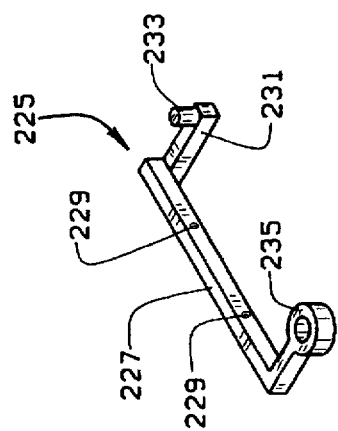
FIG. 10 is an isometric view of an optional wall bracket for the rack system of the present invention.
Figure 11:
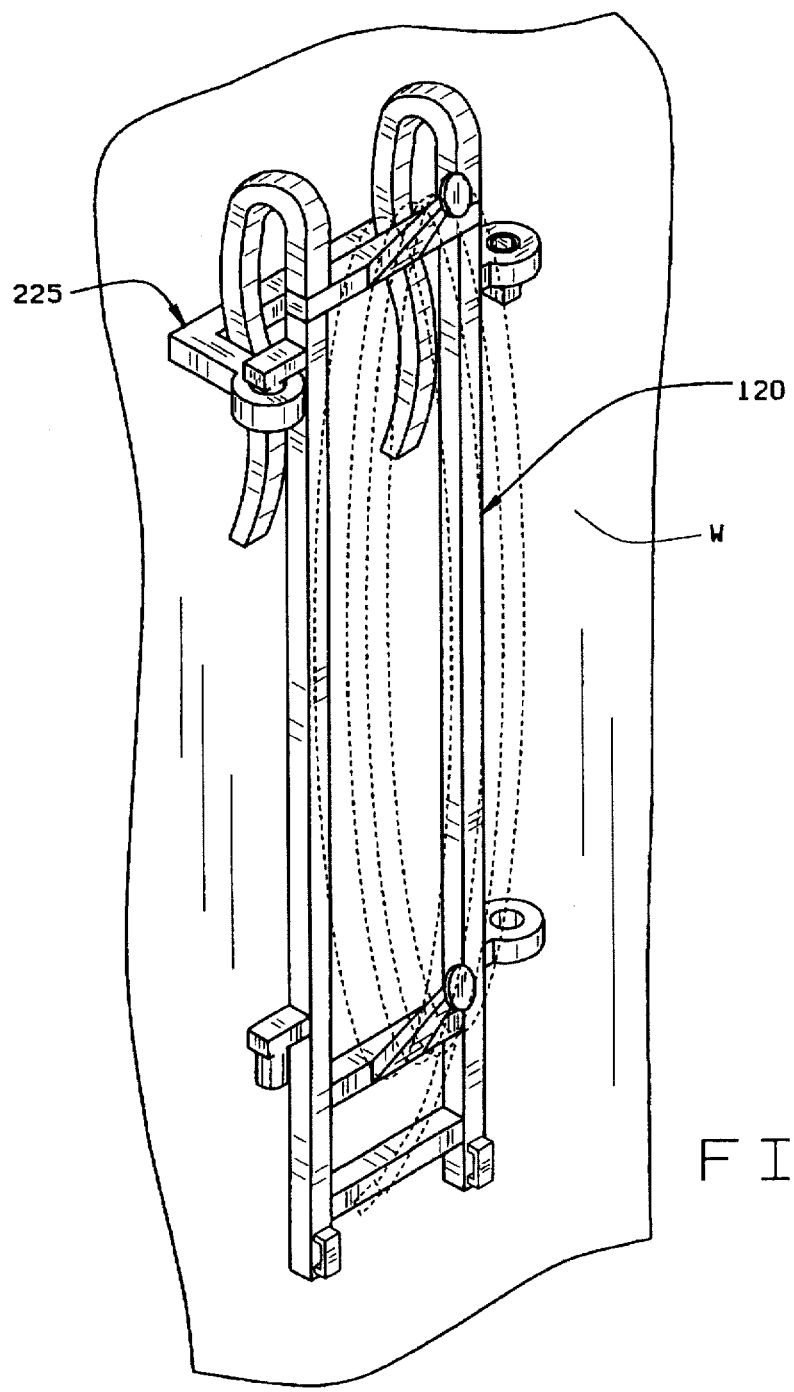
FIG. 11 is front plan of a wall mount rack shown attached to a section of wall, an individual hose rack attached to the wall mount.

Several novel accessories for the rack system of the present invention are shown in FIGS. 10–13. FIGS. 10 and 11 illustrate a novel wall bracket 225 of the present invention. Wall bracket 225 has a horizontally elongated brace 227. Brace 227 has a pair of mounting holes 229 for the insertion of mounting screws (not shown) or other appropriate mounting means. At one end of brace 227 is an outwardly extending hinge arm 231 with an upwardly extending hinge pin 233. At the opposite end of brace 227 is an outwardly extending hinge ring 235. It will be noted that a substantially longer brace 227 can be provided having a series of hinge arms and hinge rings. It will be appreciated that the hinge pin 233 and hinge ring 235 are extend outward from the brace a sufficient distance to accommodate the depth of any one of the previously described individual rocks. As shown in FIG. 11, the wall bracket 225 is mounted to a wall W. A hose rack 120 is removably suspended on bracket 225. The upwardly extending hinge pin 233 of bracket 225 engages the upper hinge ring of the hose rack. The downwardly depending hinge pin of the hose rack 120 engages the hinge ring 235 of the wall bracket 225. In this manner the hose rack is suspended or hung on the wall bracket. The utility of the design is readily appreciated. One or more wall brackets 225 can be attached to a wall or other flat surface in a user's utility shed, garage or basement. Any individual rack, for example the hose rack 120 or the shelf rack 160, with the tools in place, can be removed from the wheeled carrier and hung on the wall mount for convenient storage. When the user desires to use the hose, for example, with the wheeled cart, he or she easily can lift the loaded hose rack off the wall mount and hang it on the wheeled container.

Figure 12:
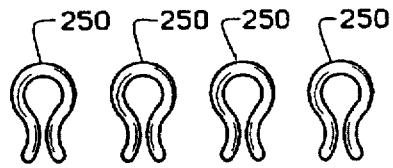
FIG. 12 is a plurality of individual bag clips.

FIG. 12 illustrates a plurality of bag clips, each clip indicated generally be reference numeral 250. Each clip 250 is a substantially U shaped clip designed to slip over the edge E of a wheeled container and tightly adhere to the edge. The clips are designed to secured a flexible plastic bag B (FIG. 2) in place inside chamber 4 of the wheeled container. The bag can be placed inside chamber 4 and the upper open edge of the bag B draped over edge E. A number of clips 250 then are slipped over edge E to hold the bag in place.

Figure 13:
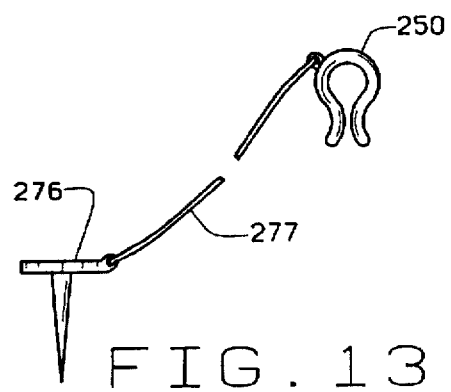
FIG. 13 is a perspective view of a wheeled container anchor of the rack system of the present invention.

An anchor device to be used with a wheeled container is shown in FIG. 13. The anchor is designed to stabilize a wheeled container parked or resting on a hillside, incline, or uneven surface. The anchor device, indicated generally by reference numeral 275 has a clip 250 connected to a spike 276 by a flexible strap 277. Spike 276 has a flat, foot or hand engaging top surface 278. In use, the clip is fastened over the edge E of a wheeled container. The spike 276 is forced into the ground, uphill from the wheeled container, by exerting downward pressure with the hand or foot on surface 278. It will be appreciated that the wheeled container will be held in place by the anchor 275.

Those skilled in the art will recognize that various changes and modifications may be made in the rack system of the present invention without departing from the scope of the appended claims. For example, additional individual racks, designed to accommodate specialty tools or the like, may be added to the system. The various dimensions of the racks may be altered or an individual rack may be designed to accommodate more than one tool. Therefore, the foregoing description and accompanying drawings are intended to be illustrative only and should not be construed in a limiting sense.

What is claimed:

1. A system of racks for removably mounting to a wheeled container to hold yard and garden tools, the system comprising:
   a plurality of individual racks;
   hook means on each said individual rack for attaching each said individual rack to a peripheral edge of the wheeled container;
   means on each said individual rack for attaching each said individual rack to an adjacent individual rack attached to said wheeled container; and
   means on each said individual rack for holding the yard or garden tool.

2. The system of racks of claim 1 wherein the means on each said individual rack for attaching each said rack to an adjacent individual rack further comprises interlocking hinge means.

3. The system of racks of claim 1 wherein the means on each said individual rack for securing the yard or garden tool comprises a plurality of vertically aligned ears, at least two of each ears having a hole formed therein to accommodate the introduction of a long handle of a yard or garden tool.

4. The system of racks of claim 1 wherein the means on each said individual rack for securing the yard or garden tool comprises at least one shelf.

5. The system of racks of claim 4 further comprising at least three shelves vertically aligned on said rack, said shelves increasing in size from a top shelf to a bottom shelf.

6. The system of racks of claim 1 wherein the means on each said individual rack for securing the yard or garden tool comprises at least one peg.

7. The system of racks of claim 1 wherein the means on each said individual rack for securing the yard or garden tool comprises at least one frame and a floor for supporting a wide-handled tool.

8. The system of racks of claim 1 further comprising an individual rack designed to hold hand tools, said hand tool rack including a vertical frame having an upper end and a lower end, a first protruding frame at the upper end and a second protruding frame at the lower end, said second protruding frame including a floor.

9. A modular rack assembly to be used with a wheeled container, the rack assembly comprising:
   a plurality of individual racks, each said rack having a first vertical frame member and a second vertical frame member;
   hook means on an upper end of each vertical frame member for removably attaching said rack to the wheeled container;
   hinge connector means on an outer side of each said vertical frame member to hingedly connect each individual rack to an adjacent individual rack; and
   a tool holding means between each vertical frame member.

10. The modular rack assembly of claim 9 wherein the hinge connector means on the outside of each vertical frame member further comprise a pair of vertically aligned hinge pins on the outside of said first vertical frame member and a pair of vertically aligned hinge rings on the outside of the second vertical frame member whereby the hinge pins of a first individual rack can engage the hinge rings of a second adjacent rack.

11. The modular rack assembly of claim 9 wherein each vertical frame member has a loop on a lower end for the introduction of a seeing strap therethrough.

12. The modular rack assembly of claim 9 further comprising at least one individual horizontal elongated wall brackets, said bracket having a hinge pin at a first end and a hinge ring at a second end, each said wall bracket disposed to allow the removable mounting of one said individual racks with a hinge pin of the individual rack engaging the hinge ring of the bracket and the hinge pin of the bracket engaging a hinge ring of the individual rack.

13. The modular rack system of claim 9 wherein at least one of said individual racks is designed to hold a long-handled tool, said long handled-tool rack including a vertical frame having an upper end and a lower end, a first handle support member at the upper end having an opening formed therein and a second handle support member adjacent the lower end having an opening formed therein.

14. The modular rack system of claim 9 wherein at least one of said individual racks is designed to hold a wide handled tool, said wide handled tool rack including a vertical frame having an upper end and a lower end, a first protruding frame at the upper end and a second protruding frame at the lower end, said second protruding frame including a floor.

15. The module rack system of claim 9 wherein at least one of said individual racks is designed to hold small hand tools, said rack comprising a vertical frame and at least one shelf thereon.

16. The modular rack system of claim 9 wherein at least one of said individual racks has at least one horizontal shelf between the vertical support members.

17. The modular rack system of claim 9 wherein at least one of said individual racks has at least one peg thereon.

18. The modular rack system of claim 9 further comprising a plurality of clips disposed to clip over an upper edge of the wheeled container to secure a bag in the wheeled container.

19. The modular rack system of claim 9 further including a removable anchoring means, said anchoring means comprising an elongated strap having a clip at a first end and a ground engaging spike at a second end, said clip disposed to removably attach to the wheeled container; wherein the clip is attached to the wheeled container and the spike is secured in the ground so that the wheeled cart is held in place on an uneven surface by said strap.

20. The modular rack system of claim 9 constructed from a resin material.

* * * * *